United States Patent
Guo et al.

(10) Patent No.: US 12,208,522 B2
(45) Date of Patent: Jan. 28, 2025

(54) METHOD FOR CONTROLLING A ROBOT AND ROBOT CONTROLLER

(71) Applicant: Robert Bosch GmbH, Stuttgart (DE)

(72) Inventors: Meng Guo, Beijing (CN); Mathias Buerger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 238 days.

(21) Appl. No.: 17/998,571

(22) PCT Filed: May 6, 2021

(86) PCT No.: PCT/EP2021/062058
§ 371 (c)(1),
(2) Date: Nov. 11, 2022

(87) PCT Pub. No.: WO2021/244819
PCT Pub. Date: Dec. 9, 2021

(65) Prior Publication Data
US 2023/0202034 A1 Jun. 29, 2023

(30) Foreign Application Priority Data
Jun. 5, 2020 (DE) ...................... 10 2020 207 085.7

(51) Int. Cl.
*B25J 9/16* (2006.01)

(52) U.S. Cl.
CPC .............. *B25J 9/163* (2013.01); *B25J 9/161* (2013.01); *B25J 9/1661* (2013.01); *B25J 9/1664* (2013.01)

(58) Field of Classification Search
CPC ............ G06N 7/01; G05B 2219/40429; G05B 2219/39244; G05B 2219/39205;
(Continued)

(56) References Cited

U.S. PATENT DOCUMENTS 10,339,919 B1 * 7/2019 Raux .................. G10L 15/063
10,789,543 B1 * 9/2020 Sun .......................... G06N 7/01
(Continued)

FOREIGN PATENT DOCUMENTS

EP 3753684 A1 12/2020
JP 2009066692 A 4/2009

OTHER PUBLICATIONS

International Search Report for PCT/EP2021/062058, Issued Aug. 17, 2021.
(Continued)

*Primary Examiner* — Jaime Figueroa
*Assistant Examiner* — Zachary Joseph Wallace
(74) *Attorney, Agent, or Firm* — NORTON ROSE FULBRIGHT US LLP; Gerard A. Messina (57) ABSTRACT

A method for controlling a robot. The method includes providing demonstrations for performing each of a plurality of skills; training from the demonstrations, a robot trajectory model for each skill, each trajectory model is a hidden semi-Markov model having one or more initial states and one or more final states; training, from the demonstrations, a precondition model for each skill comprising, for each initial state, a probability distribution of robot configurations before executing the skill, and a final condition model for each skill comprising, for each final state, a probability distribution of robot configurations after executing the skill; receiving a description of a task, the task includes performing the skills of the plurality of skills in sequence and/or branches; generating a composed robot trajectory model; and controlling the robot according to the composed robot trajectory model to execute the task.

11 Claims, 6 Drawing Sheets

(58) Field of Classification Search
CPC .......... G05B 2219/40629; B25J 9/1664; B25J 9/1661; B25J 9/163; B25J 9/161
See application file for complete search history.

(56) References Cited

U.S. PATENT DOCUMENTS

| | | | |
|---|---|---|---|
| 11,436,869 B1* | 9/2022 | Kirmani | G06V 10/40 |
| 11,498,212 B2* | 11/2022 | Kupcsik | B25J 9/163 |
| 11,868,728 B1* | 1/2024 | Meissner | G06F 3/0484 |
| 2013/0151442 A1* | 6/2013 | Suh | G06N 3/008 |
| | | | 706/12 |
| 2013/0218340 A1 | 8/2013 | Hager et al. | |
| 2020/0043476 A1* | 2/2020 | Hwang | H04N 21/4788 |
| 2020/0070343 A1* | 3/2020 | Thomaz | B25J 9/163 |
| 2020/0372410 A1* | 11/2020 | Karaletsos | G06N 20/00 |
| 2020/0398427 A1* | 12/2020 | Kupcsik | B25J 9/163 |
| 2021/0122036 A1* | 4/2021 | Buerger | B25J 9/163 |
| 2021/0379758 A1* | 12/2021 | Chu | B25J 9/1661 |

OTHER PUBLICATIONS

Schwenkel et al., "Optimizing Sequences of Probabilistic Manipulation Skills Learned From Demonstration," 3rd Conference on Robot Learning (CORL 2019), 2019, pp. 1-10.

Iwata et al., "Learning and Generation of Actions From Teleoperation for Domestic Service Robots," 2018 IEEE/RSJ International Conference on Intelligent Robots and Systems (IROS), IEEE, Madrid, Spain, 2018, pp. 8184-8191.

Pignat et al., "Learning Adaptive Dressing Assistance From Human Demonstration," Robotics and Autonomous Systems, vol. 93, 2017, pp. 61-75.

Rozo et al., "Learning and Sequencing of Object-Centric Manipulation Skills for Industrial Tasks," 2020 IEEE/RSJ International Conference on Intelligent Robots and Systems (IROS), 2020, pp. 1-8.

* cited by examiner

METHOD FOR CONTROLLING A ROBOT AND ROBOT CONTROLLER

FIELD

The present invention relates to methods for controlling a robot and robot controllers.

BACKGROUND INFORMATION

Robotic skills may be programmed through learning-from-demonstration approaches, where a nominal plan of a skill is learned by a robot from demonstrations. However, the skill to be applied to carry out a certain task may vary depending on the initial system state. For example, when the task includes picking up an object, the skill to be applied may be "pick up object from the side" or "pick up the object from the top" depending on how the object is oriented. Further, if the object is picked up from the side, it may be necessary to reorient the object to proceed further in the task. Therefore, approaches that allow robots to sequence several skills and apply them alternatively in changing situations are desirable.

In L. Schwenkel, M. Guo, and M. Bürger, "Optimizing sequences of probabilistic manipulation skills learned from demonstration," in Conference on Robot Learning, 2019, (which is in the following referred to as reference [1]), a skill-centric approach is described where each skill is learned independently under various scenarios but not attached to any specific task.

SUMMARY

According to various embodiments of the present invention, a method for controlling a robot is provided including providing demonstrations for performing each of a plurality of skills, training, from the demonstrations, a robot trajectory model for each skill, wherein each trajectory model is a hidden semi-Markov model having one or more initial states and one or more final states, training, from the demonstrations, a precondition model for each skill including, for each initial state of the robot trajectory model of the skill, a probability distribution of robot configurations before executing the skill, and a final condition model for each skill including, for each final state of the robot trajectory model of the skill, a probability distribution of robot configurations after executing the skill, receiving a description of a task, wherein the task includes performing the skills of the plurality of skills in sequence and/or branches, generating a composed robot trajectory model by When two skills are to be performed in sequence in the task, cascading the robot trajectory models of the skills by Including the states of the trajectory models of the two skills in the composed robot trajectory model and Calculating a transition probability between each final state of the trajectory model of the first skill of the two skills and each initial state of the trajectory model of the second skill of the two skills as a function of the similarity between the probability distribution of the final condition model of the first skill for the final state of the first skill and the probability distribution of the initial model of the second skill for the initial state for the second skill When two skills are performed in branches in the task, combining the robot trajectory models of the skills by Including the states of the trajectory models of the two skills in the composed robot trajectory model and Setting the transition probability between states of the first skill and states of the second skill to zero; and controlling the robot in accordance with the composed robot trajectory model to execute the task.

According to a further embodiment of the present invention, a robot controller configured to perform the method described above is provided.

This method for controlling a robot and the robot controller described above allow automatic composition of manipulation skills to perform a specified manipulation task. Thus, a user or operator does not need to manually define branching conditions for choosing among different skills to perform the task. In other words, after specifying the task diagram, the operator can directly run it, even if the task diagram includes skills in branches, i.e. the need to select between different skills depending on the current system state (e.g. robot and/or object configuration).

This may save significant effort in performing a manipulation task, as evaluating branching conditions needs direct access to various sensors such as robot joint states, pose of objects been manipulated. Reading and recording the correct data can be quite time consuming. Furthermore, such data needs to be directly written into the source code, which would require direct access to source code. Moreover, the provided controlling method and robot controller increase robustness of task execution, as it is often the case that the combination of branching conditions fails to cover the whole state space and consequently there are situations where no conditions are satisfied, leading to a failure.

In the following, various examples are given.

Example 1 is a method for controlling a robot as described above.

Example 2 is the method of Example 1, wherein each skill includes a manipulation of one or more objects by the robot and the hidden semi-Markov model of each skill is a task-parameterized hidden semi-Markov model including task parameters corresponding to a robot and object configuration in which the skill is applied.

In particular, various embodiments allow efficient training and control of a robot for handling one or more objects.

Example 3 is the method of Example 2, further including training, for each skill, an effect model including, for each final state of the robot trajectory model of the skill, a probability distribution of how the robot and/or object configuration is changed after executing the skill relative to an initial robot and/or object configuration to which the skill is applied, wherein, when two skills are to be performed in sequence in the task, cascading the robot trajectory models of the skills includes transforming the task-parameterized hidden semi-Markov model of the second skill such that its task parameters are task parameters corresponding to the robot and/or object configuration given by the effect model of the first skill.

Thus, it can be ensured that a control trajectory is correctly computed over a sequence of skills. For example, the transformation of the model ensures that the associated global Gaussian of the second skill can be directly computed based on the initial state of the first skill. The global Gaussian can then be used to compute observation probabilities, e.g. for application of Viterbi algorithm.

Example 4 is the method of Example 3, further including affine-transforming the effect model of the second skill such that its task parameters are the task parameters corresponding to the robot and/or object configuration given by the effect model of the first skill.

This allows correct computation of a control trajectory over sequence of skills in a scenario with one or more objects which are for example to manipulated by the robot.

Example 5 is the method of any one of Examples 1 to 4, further including, when two skills are to be performed in sequence in the task, using the precondition model of the first skill as precondition model for the cascaded robot trajectory models of the skills of the two skills and using the final condition model of the second skill as final condition model for the cascaded robot trajectory models of the skills.

By computing a precondition model for a cascade of skills, further skills may be added, e.g. a composed model for more than two skills in sequence or in branches may be determined. This allows training and control for complex tasks.

Example 6 is the method of any one of Examples 1 to 5, further including, when two skills are to be performed in branch in the task, including both the precondition model for the first skill and the precondition model for the second skill in the precondition model of the combined robot trajectory models of the skills and including both the final condition model for the first skill and the final condition model for the second skill in the precondition model of the combined robot trajectory models of the skills.

By computing a precondition model for branches of skills, further skills may be added, e.g. a composed model for more than two skills in sequence of branches may be determined. This allows training and control for complex tasks.

Example 7 is the method of any one of Examples 1 to 6, wherein the similarity between the probability distribution of the final condition model of the first skill for the final state of the first skill and the probability distribution of the initial model of the second skill for the initial state for the second skill is a KL-divergence of the probability distribution of the final condition model of the first skill for the final state of the first skill and the probability distribution of the initial model of the second skill for the initial state for the second skill.

Usage of KL-divergence allows an efficient concatenation of trajectory models for sequences of skills.

Example 8 is the method of any one of Examples 1 to 7, wherein the precondition model and the final condition model are task-parameterized Gaussian mixture models.

For example, a Gaussian is determined for each task parameter value. Task-parameterization allows application of trained models in different scenarios (i.e. varying initial system states (configurations)).

Example 9 is the method of any one of Examples 1 to 8, wherein generating the composed robot trajectory model includes repeatedly cascading robot trajectory models, cascaded robot trajectory models and combined robot trajectory models and combining robot trajectory models, cascaded robot trajectory models and combined robot trajectory in accordance with the task such that the robot trajectory model is a trajectory model for the whole task.

Thus a composed model for a complex task may be iteratively determined, ensuring robustness for a complex task and freeing an operator from the need to define a complex hierarchy of branching conditions.

Example 10 is a robot controller configured to perform the method of any one of Examples 1 to 9.

Example 11 is a computer program including instructions which, when executed by a processor, makes the processor perform a method according to any one of Examples 1 to 9.

Example 12 is a computer readable medium storing instructions which, when executed by a processor, makes the processor perform a method according to any one of Examples 1 to 9.

In the figures, similar reference characters generally refer to the same parts throughout the different views. The figures are not necessarily to scale, emphasis instead generally being placed upon illustrating the features of the present invention.

In the following description, various aspects are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects of the present invention.

In the following, various examples will be described in more detail.

Figure 1:
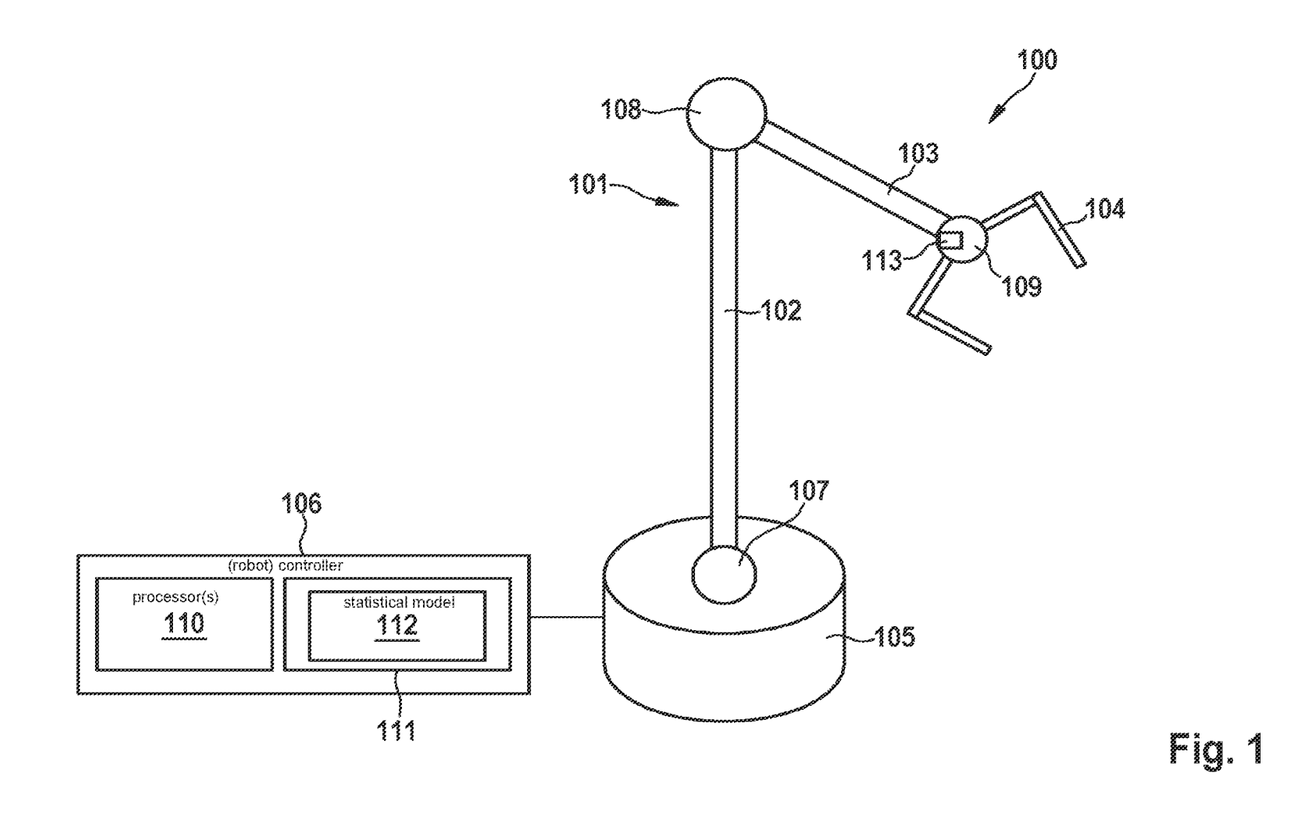
FIG. 1 shows a robot, according to an example embodiment of the present invention.

FIG. 1 shows a robot 100.

The robot 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm (possibly with a tool at its end).

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e. rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot arm 101. According to various embodiments, the controller 106 controls the robot arm 101 on the basis of a statistical model 112 stored in the memory 111.

A robot 100 can take advantage of learning-from-demonstration (LfD) approaches to learn to execute a task or collaborate with a human partner. Human demonstrations can be encoded by a probabilistic model (also referred to as statistical model) that represents the nominal plan of the task for the robot. The controller 106 can subsequently use the statistical model, which is also referred to as robot trajectory model, to generate the desired robot movements, possibly as a function of the state of both the human partner and the environment.

The basic idea of LfD is to fit a prescribed skill model such as GMMs to a handful of demonstrations. Let there be M demonstrations, each of which contains $T_m$ data points for a dataset of $N=\Sigma_m T_m$ total observations $\xi=\{\xi_t\}_{t=1}^N$, where $\xi_t \in \mathbb{R}^d$. Also, it is assumed that the same demonstrations are recorded from the perspective of P different coordinate systems (given by the task parameters such as local coordinate systems or frames of objects of interest). One common way to obtain such data is to transform the demonstrations from a static global frame to frame p by $\xi_t^{(p)}=A^{(p)^{-1}}(\xi_t-b^{(p)})$. Here, $\{(b^{(p)},A^{(p)})\}_{p=1}^P$ is the translation and rotation of (local) frame p w.r.t. the world (i.e. global) frame. Then, a TP-GMM is described by the model parameters $\{\pi_k,\{\mu_k^{(p)},\Sigma_k^{(p)}\}_{p=1}^P\}_{k=1}^K$ where K represents the number of Gaussian components in the mixture model, $\pi_k$ is the prior probability of each component, and $\{\mu_k^{(p)},\Sigma_k^{(p)}\}_{p=1}^P$ are the parameters of the k-th Gaussian component within frame p.

Differently from standard GMM, the mixture model above cannot be learned independently for each frame. Indeed, the mixing coefficients $\pi_k$ are shared by all frames and the k-th component in frame p must map to the corresponding k-th component in the global frame. Expectation-Maximization (EM) is a well-established method to learn such models.

Once learned, the TP-GMM can be used during execution to reproduce a trajectory for the learned skill. Namely, given the observed frames $\{b^{(p)},A^{(p)}\}_{p=1}^P$, the learned TP-GMM is converted into one single GMM with parameters $\{\pi_k, (\hat{\mu}_k, \hat{\Sigma}_k)\}_{k=1}^K$, by multiplying the affine-transformed Gaussian components across different frames, as follows $$\hat{\Sigma}_k = \left[\sum_{p=1}^P (\hat{\Sigma}_k^{(p)})^{-1}\right]^{-1}, \hat{\mu}_k = \hat{\Sigma}_k \left[\sum_{p=1}^P (\hat{\Sigma}_k^{(p)})^{-1}\hat{\mu}_k^{(p)}\right], \quad (1)$$

where the parameters of the updated Gaussian at each frame p are computed as $\hat{\mu}_k^{(p)}=A^{(p)}\mu_k^{(p)}+b^{(p)}$ and $\hat{\Sigma}_k^{(p)}=A^{(p)}\Sigma_k^{(p)}A^{(p)^T}$. While the task parameters may vary over time, the time index is dropped for the sake of notation.

Hidden semi-Markov Models (HSMMs) extend standard hidden Markov Models (HMMs) by embedding temporal information of the underlying stochastic process. That is, while in HMM the underlying hidden process is assumed to be Markov, i.e., the probability of transitioning to the next state depends only on the current state, in HSMM the state process is assumed semi-Markov. This means that a transition to the next state depends on the current state as well as on the elapsed time since the state was entered. They can be applied, in combination with TP-GMMs, for robot skill encoding to learn spatio-temporal features of the demonstrations. More specifically, a task-parameterized HSMM (TP-HSMM) model is defined as:

$$\Theta=\{\{a_{hk}\}_{h=1}^K,(\mu_k^D,\sigma_k^D),\pi_k,\{(\mu_k^{(p)},\Sigma_k^{(p)})\}_{p=1}^P\}_{k=1}^K,$$

where $a_{hk}$ is the transition probability from state h to k; $(\mu_k^D,\sigma_k^D)$ describe the Gaussian distributions for the duration of state k, i.e., the probability of staying in state k for a certain number of consecutive steps; $\{\pi_k,\{\mu_k^{(p)},\Sigma_k^{(p)}\}_{p=1}^P\}_{k=1}^K$ equal the TP-GMM introduced earlier, representing the observation probability corresponding to state k. Note that herein the number of states corresponds to the number of Gaussian components in the "attached" TP-GMM.

Given a certain (partial) sequence of observed data points $\{\xi_\ell\}_{\ell=1}^t$, assume that the associated sequence of states in $\Theta$ is given by $s_t=s_1 s_2 \ldots s_t$. The probability of data point $\xi_t$ belonging to state k (i.e., $s_t=k$) is given by the forward variable $\alpha_t(k)=p(s_t=k,\{\xi_\ell\}_{\ell=1}^t)$:

$$\alpha_t(k)=\Sigma_{\tau=1}^{t-1}\Sigma_{h=1}^K \alpha_{t-\tau}(h)a_{hk}\mathcal{N}(\tau|\mu_k^D,\sigma_k^D)o_\tau^t, \quad (2)$$

where $o_\tau^t=\prod_{\ell=t-\tau+1}^t \mathcal{N}(\xi_\ell|\hat{\mu}_k,\hat{\Sigma}_k)$ is the emission probability and $(\hat{\mu}_k,\hat{\Sigma}_k)$ are derived from (1) given the task parameters. Furthermore, the same forward variable can also be used during reproduction to predict future steps until $T_m$.

In this case however, since future observations are not available, only transition and duration information are used, i.e., by setting $\mathcal{N}(\xi_\ell|\hat{\mu}_k,\hat{\Sigma}_k)=1$ for all k and $\ell>t$ in (2). At last, the sequence of the most-likely states $s_{T_m}^*=s_1^* s_2^* \ldots s_{T_m}^*$ is determined by choosing $s_t^*=\text{argmax}_k \alpha_t(k), \forall 1\leq t\leq T_m$.

Let now a desired final observation of the robot state be given as $\xi_T$, where T is the skill time horizon (e.g. the average length over the demonstrations). Moreover, the initial robot state is observed as $\xi_1$. For execution of the skill (i.e. skill reproduction) given the learned model $\Theta_a$, the most-likely state sequence $s_T^*$ given only $\xi_1$ and $\xi_T$ is constructed.

Reproduction using the forward variable cannot be directly in that case since the forward variable in equation (2) computes the sequence of marginally most probable states, while what is desired is the jointly most probable sequence of states given $\xi_1$ and $\xi_T$. As a result, when using (2) there is no guaranteeing that the returned sequence $s_T^*$ matches both the spatio-temporal patterns of the demonstrations and the final observation. In terms of an example of picking up an object, it may return a most likely sequence corresponding to "pick from the side", even if the desired final configuration is that the end-effector is on the top of object.

To overcome this issue, according to one embodiment, a modification of the Viterbi algorithm is used. The classical Viterbi algorithm can be used to find the most likely sequence of states (also called the Viterbi path) in HMMs that result in a given stream of observed events. According to one embodiment, an approach is used which differs from that in two main aspects: (a) it works on HSMM instead of HMM; and more importantly (b) most observations except the first and the last ones are missing. Specifically, in the absence of observations the Viterbi algorithm becomes $$\delta_t(j) = \max_{d \in \mathcal{D}} \max_{i \neq j} \delta_{t-d}(i) a_{ij} p_j(d) \prod_{t'=t-d+1}^{t} \tilde{b}_j(\xi_{t'}), \quad (3)$$

$$\delta_1(j) b_j(\xi_1) \pi_j p_j(1),$$

where $p_j(d) = \mathcal{N}(d | \mu_j^P, \sigma_j^P)$ is the duration probability of state j, $\delta_t(j)$ is the likelihood of the system being in state j at time t and not in state j at t+1; and $$\tilde{b}_j(\xi_{t'}) = \begin{cases} \mathcal{N}(\xi_{t'} | \hat{\mu}_j, \hat{\Sigma}_j), & t = 1 \vee t = T; \\ 1, & 1 < t < T. \end{cases}$$

where $(\hat{\mu}_j, \hat{\Sigma}_j)$ is the global Gaussian component j in $\Theta_a$ from (1) given $\xi_t$. Namely, at each time t and for each state j, the two arguments that maximize equation $\delta_t(j)$ are recorded, and a simple backtracking procedure is used to find the most likely state sequence $s_T^*$. In other words, the above algorithm derives the most-likely sequence $s_T^*$ for skill a that yields the final observation $\xi_T$, starting from $\xi_1$.

As the robot task space is represented by time-varying poses (with position and orientation) of the end-effector, classical Euclidean-based methods are inadequate for processing such data. Therefore, according to various embodiments, the robot task space is endowed with a Riemannian manifold $\mathcal{M}$. Briefly, for each point x in the manifold $\mathcal{M}$, there exists a tangent space $\mathcal{T}_x \mathcal{M}$. This allows us to carry out Euclidean operations locally, while being geometrically consistent with manifold constraints.

Exponential and logarithmic maps may be used to map points between $\mathcal{T}_x \mathcal{M}$ and $\mathcal{M}$. The exponential map $\text{Exp}_x: \mathcal{T}_x \mathcal{M} \to \mathcal{M}$ maps a point in the tangent space of point x to a point on the manifold, while maintaining the geodesic distance. The inverse operation is called the logarithmic map $\text{Log}_x: \mathcal{M} \to \mathcal{T}_x \mathcal{M}$. Another useful operation is the parallel transport $\parallel_x^y: \mathcal{T}_x \mathcal{M} \to \mathcal{T}_y \mathcal{M}$, which moves elements between tangent spaces without introducing distortion. The exact form of the aforementioned operations depends on the Riemannian metric associated to the manifold. According to various embodiments, Riemannian manifolds are used to properly compute statistics over $\mathcal{M}$ using Riemannian normal distributions that encode the observed motion patterns and retrieve the control actions corresponding to the task plan (i.e., sequenced skills) using a Riemannian optimal controller.

For the following explanations, a multi-DoF robotic arm 101 is considered as example, whose end-effector 104 has state $x_e \in \mathbb{R}^3 \times \mathcal{S}^3 \times \mathbb{R}^1$ (describing the Cartesian position, orientation quaternion and gripper state), that operates within a static and known workspace. Also, within the reach of the arm 101, there are objects of interest denoted by $O = \{o_1, o_2, \ldots, o_j\}$, each of which has state $x_o \in \mathbb{R}^3 \times \mathcal{S}^3$. For simplicity, the overall system state is denoted by $x = \{x_e, \{x_o, \forall o_j \in O\}\}$.

Within this setup, a human user performs several kinaesthetic demonstrations on the arm to manipulate one or several objects for certain manipulation skills. Let the set of demonstrated skills be denoted by $A = \{a_1, a_2, \ldots, a_H\}$. Moreover, for skill $a \in A$, the set of objects involved is given by $O_a$ and the set of available demonstrations is denoted by $D_a$. It should be noted that all demonstrations follow the object-centric structure introduced above, i.e., they are recorded from multiple frames, normally associated to the objects in $O_a$, which often represent the object pose in the workspace. For example, the skill "insert the peg in the cylinder" involves the objects "peg" and "cylinder", and the associated demonstrations are recorded from both the robot, the "peg" and the "cylinder" frames.

The (manipulation) task that is considered in the following consists of a sequence of skills a* chosen from the demonstrated skills A. For example, an insertion task involves "pick the cap, re-orient the cap, pick the cap again and the insert the cap". In the end of the task, a goal configuration G is reached as the desired final state of the system, including the robot and the objects.

The common way of organizing manipulation tasks in factory is via a diagram or flowchart. They are commonly defined via drag-and-drop in a GUI (graphical user interface). Such an approach is sufficient if two conditions hold: (1) the task is simple and specified as a linear sequence of skills; (2) each skill is simple without branches. In this way, each skill can be triggered and executed in sequence as specified.

However, in many cases, either one of the above conditions does not hold. For instance, the desired task has multiple choices of execution in various workspace situations or some skills inside have multiple choices of execution in various situations.

Figure 2:
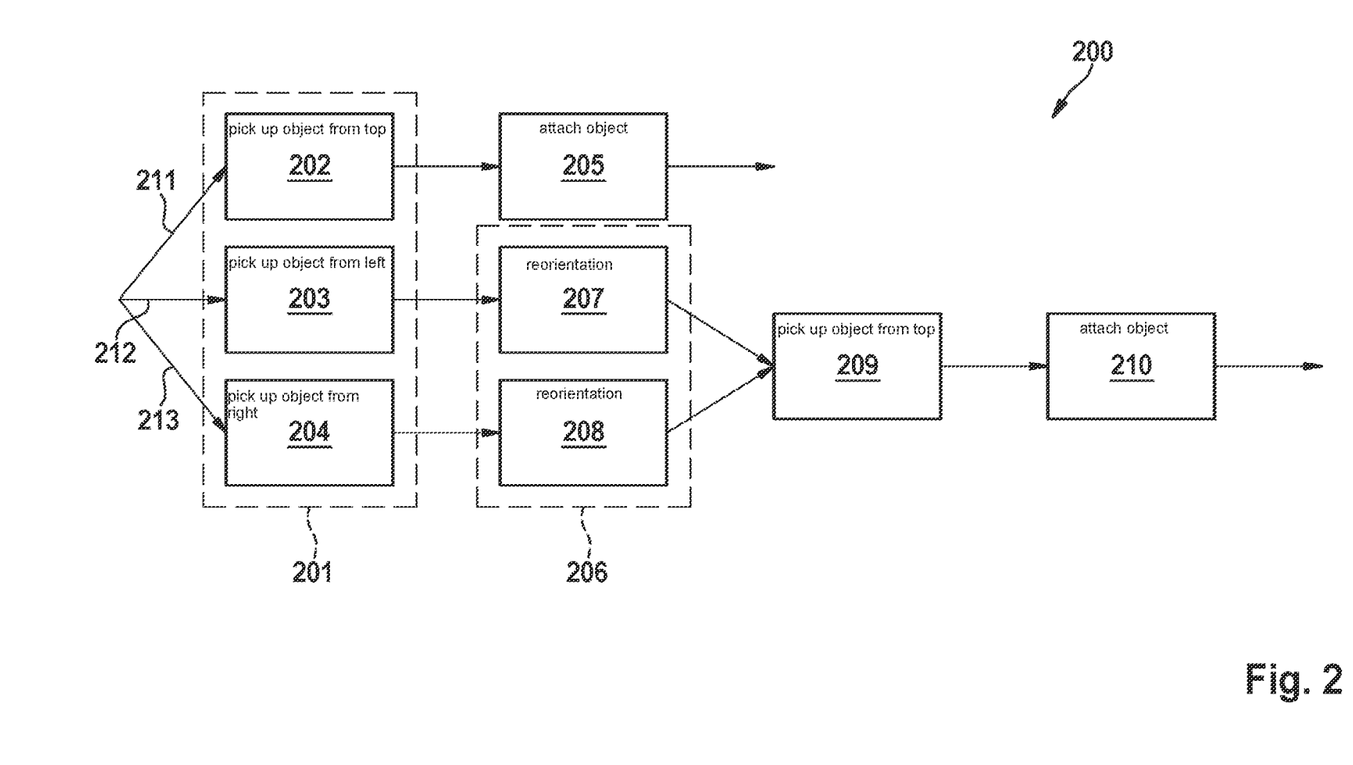
FIG. 2 shows a flow diagram illustrating a manipulation task including skills in sequence and in branches, according to an example embodiment of the present invention.

FIG. 2 shows a flow diagram (or task diagram) 200 illustrating a manipulation task including skills in sequence and in branches.

For example, the manipulation task includes, as first job 201, to pick up an object. This may mean that the robot has to execute the skill "pick up object from top" in 202, "pick up object from left" in 203 or "pick up object from the right" in 204 depending on the initial configuration (i.e. state) of the object. So, the task includes the execution of these skills in branches, i.e. they are to be executed alternatively, i.e. only one of them is to be executed. The first operation 201, i.e. the execution of one of the skills in 202, in 203 or in 204 is followed by one or more skills in sequence. For example, if the skill "pick up object from top" was executed in 202, this is followed (in sequence) by the skill "attach object" in 205.

If the respective skill in 203 or in 204 was executed, this has to be followed by a reorientation job 206, i.e., for each case by execution of a re-orientation skill in 207 or in 208. The re-orientation skills may differ in the re-orientation direction. The re-orientation operation 206 is then followed by execution of the "pick up object from top" in skill 209 and finally by the execution of the skill "attach object" in 210.

Branching may be addressed by manually specifying the branching conditions 211, 212, 213, commonly as "if" conditions, e.g. "if object is standing" 211, "if object is lying toward left" 212 and "if object is lying toward right" 213. To design such conditions, a region of system states may be manually measured as the region of validity for this condition to hold.

This means that the robot may have a set of manipulation skills pre-installed (pre-programmed from the factory or taught via demonstration) and for a particular assembly task, the operator constructs a diagram manually that specifies this task (e.g. as in FIG. 2), where the building blocks are the set of learned skills. Because of the branches (possibly both at the task-level and at the skill-level), the operator is required to manually defined the branching conditions for each branch.

According to various embodiments, approaches are provided which in particular allow avoiding the necessity for manually defining branching conditions.

Figure 3:
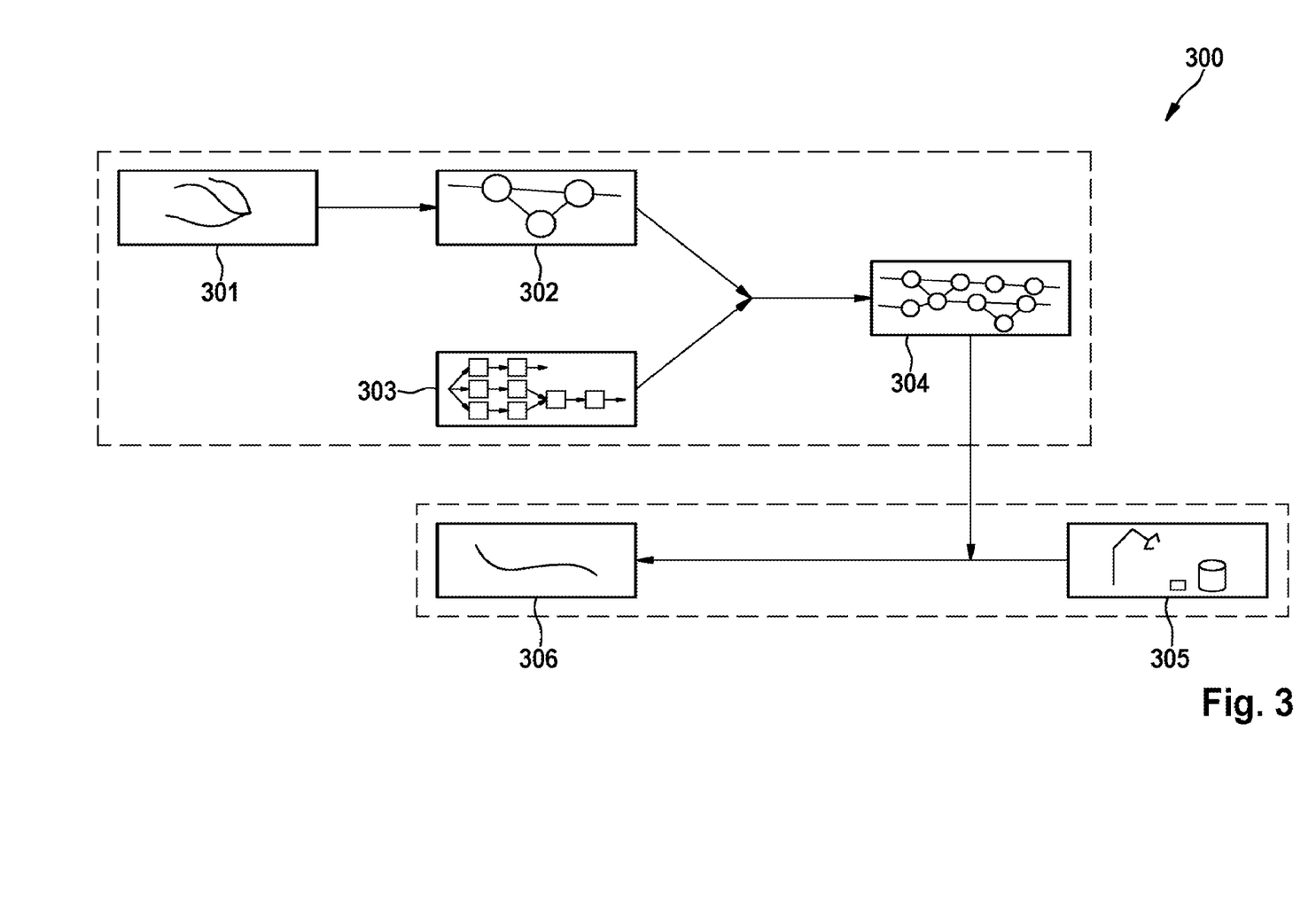
FIG. 3 shows a flow diagram illustrating a method for controlling a robot according to an example embodiment of the present invention.

FIG. 3 shows a flow diagram illustrating a method for controlling a robot according to an embodiment.

In 301, demonstrations of skills are performed.

The skills include at least those skills which are needed for the execution of a task given by a task diagram 303.

For one demonstrated skill a∈A, as described above, the set of available demonstrations is given by $D_a = \{\xi_{t,i}\}_{t=1}^{N}$, recorded in P frames. It should be noted that such frames are directly attached to the objects in $O_a$.

In 302, a robot trajectory model (also denoted as "robot behaviour model"), is learned for each skill.

For example, as described above, given a properly chosen number of components K, the TP-HSMM model $\Theta_a$ abstracting the spatio-temporal features of trajectories related to skill a, can be learned using an EM (Expectation Maximization)-like algorithm.

In 304, a composed robot trajectory model is generated from the robot trajectory models learned in 302.

For this, the learning of the skill modes further includes the learning of a pre-condition model, a final condition and an effect model for each skill. In 304, using these models, a composition model of the specified task is constructed and the choices on the task-level and the skill-level can be then made automatically depending on the workspace situation. Simply speaking, the pre-condition model encapsulates how the system should be before executing the skill, while the effect model and the final condition model encapsulate how the system should be changed after executing the skill. These models are an important part for computing the composition model as they measure the compatibility between skills and keep track of the evolution of system state. It should be noted that the term "skill model" may be understood to include all of the robot trajectory model, the precondition model, the final condition model and the effect model for the skill.

As described with reference to FIG. 2, a task may include execution of skills in branches (i.e. as alternatives) and in sequence.

Accordingly, the generation of the composed model includes recursively applying combination operations for combining skills in sequence and an operation for combining skills in parallel.

Figure 4:
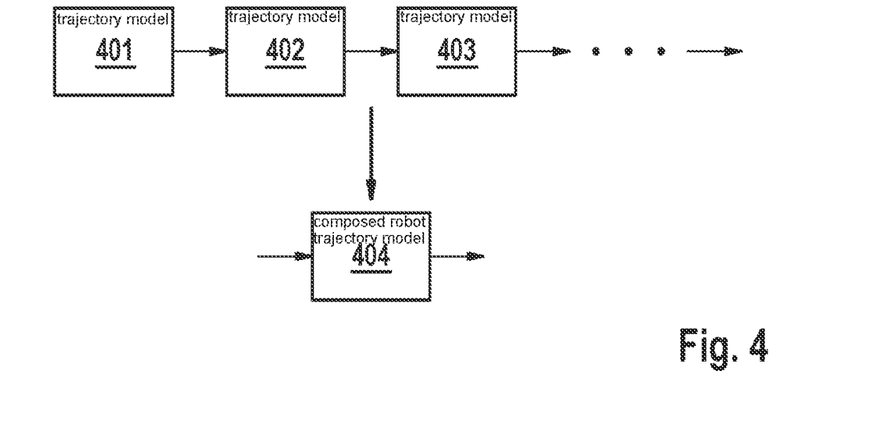
FIG. 4 illustrates a cascading operation for cascading robot trajectory models of skills which are to be executed in sequence to a composed robot trajectory model, according to an example embodiment of the present invention.

FIG. 4 illustrates a cascading operation for cascading robot trajectory models of skills 401, 402, 403 which are to be executed in sequence to a composed robot trajectory model 404.

Figure 5:
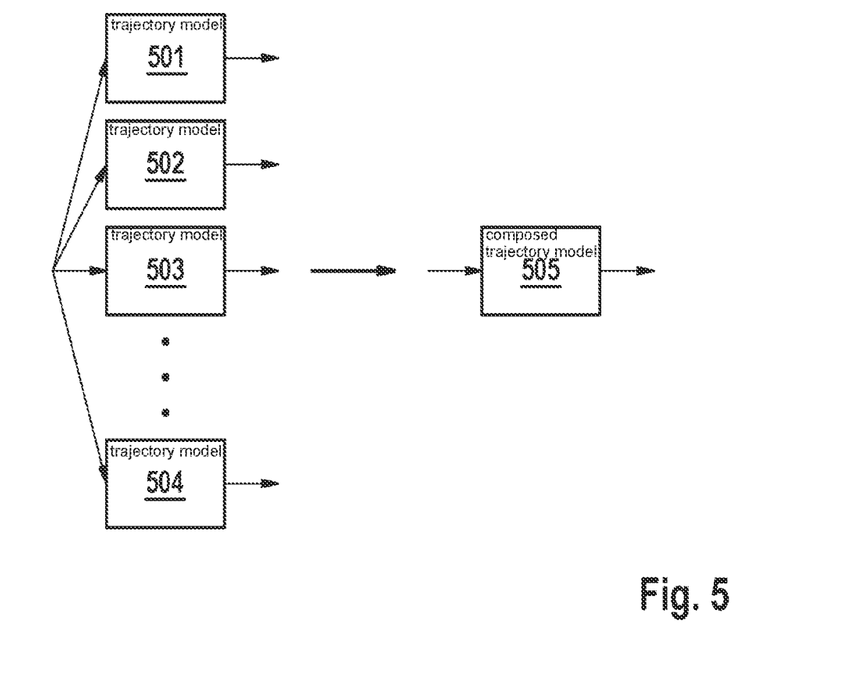
FIG. 5 illustrates a combination operation for combining robot trajectory models of skills which are to be executed in branches (i.e., alternatively) to a composed robot trajectory model, according to an example embodiment of the present invention.

FIG. 5 illustrates a combination operation for combining robot trajectory models of skills 501, 502, 503, 504 which are to be executed in branches (i.e. alternatively) to a composed robot trajectory model 505.

The combination operation of cascading a sequence of skills as illustrated in FIG. 4 includes one or more applications of an operation of cascading two skills which are to be executed in sequence. Similarly, the combination operation of combining a sequence of skills as illustrated in FIG. 5 includes one or more applications of an operation of combining two skills which are to be executed in branches.

For the combination of two skills which are to be executed in sequence, the trajectory models of the two skills are cascaded into one composed trajectory model as follows.

Considering two TP-HSMMs $\Theta_{a_1}$ and $\Theta_{a_2}$ of two skills in sequence, the operation for cascading them into $\hat{\Theta}$ is summarized in Algorithm 1.

| Algorithm 1: Cascading a pair of TP-HSMMs |
| --- |
| Input: $(\Theta_{a_1}, \Gamma_{a_1})$ and $(\Theta_{a_2}, \Gamma_{a_2})$. |
| Output: $(\hat{\Theta}, \hat{\Gamma})$ |
| 1    forall final component $k_f \in \Theta_{a_1}$ do |
| 2        Create copy of $\Theta_{a_2}$ as $\Theta_{a_2}^{k_f}$. |
| 3        Compute $\{a_{k_f,k_i}\}$ for all initial $k_i \in \Theta_{a_2}^{k_f}$ |
| 4        Update $\Theta_{a_2}^{k_f}$ and $\Gamma_{1T,a_2}^{k_f}$ |
| 5        Cascade $\Theta_{a_1}$ and $\Theta_{a_2}^{k_f}$. Add to $\hat{\Theta}$. |
| 6    Set additional parameters of $\hat{\Theta}$. |
| 7    $\hat{\Gamma} = \{\hat{\Gamma}_1, \hat{\Gamma}_T, \hat{\Gamma}_{1T}\} = \{\Gamma_{1,a_1}, \Gamma_{T,a_2}, \{\Gamma_{1T,a_2}^{k_f}, \forall k_f\}\}$. |

It should be noted that the computation and the update of lines 3 and 4 of algorithm 1 may be performed according to equations (4) and (5) given below, respectively.

A key insight can be seen in that the same model $\Theta_{a_2}$ is updated differently depending on the final component (i.e. HSMM state) of $\Theta_{a_1}$ to which $\Theta_{a_2}$ is cascaded to. This is because each final component encodes different transformations of the task parameters of $\Theta_{a_1}$ after executing $a_1$, which in turn results in different ways to update the components in $\Theta_{a_2}$. Consequently, the composed model $\hat{\Theta}$ has size $K_1 + K_{1,f} K_2$, where $K_1$ and $K_2$ are the number of components of $\Theta_{a_1}$ and $\Theta_{a_2}$, respectively, while $K_{1,f}$ is the number of final components in $\Theta_{a_1}$. More specifically, algorithm 2 consists of two main operations: (a) compute the transition probability from each final component in $\Theta_{a_1}$ to each initial component in $\Theta_{a_2}$; (b) modify all components of $\Theta_{a_2}$ for each final component in $\Theta_{a_1}$ that $\Theta_{a_2}$ is cascaded to.

According to one embodiment, a precondition model and an effect model as described in reference [1] are used. In particular, the learned precondition model, denoted by $\Gamma_{1,a}$, contains TP-GMMs for the initial robot state (i.e. the initial configuration (e.g. position and/or pose) of the robot), i.e., $\Gamma_{1,a} = \{(\hat{\mu}_1^{(p)}, \hat{\Sigma}_1^{(p)}), \forall p \in P_{1,a}\}$, where $P_{1,a}$ is the chosen set of task parameters, derived from the initial system state (i.e. the initial configuration (e.g. position and/or pose) of the robot and/or objects). In addition, a final condition model is introduced here, denoted by $\Gamma_{T,a}$, which is learned in a similar way as $\Gamma_{1,a}$, but for the final robot state, i.e., $\Gamma_{T,a} = \{(\hat{\mu}_T^{(p)}, \hat{\Sigma}_T^{(p)}), \forall p \in P_{T,a}\}$, where $P_{T,a}$ is the chosen set of frames, derived from the final system state. Simply speaking, $\Gamma_{1,a}$ models the initial configuration before executing skill a, while $\Gamma_{T,a}$ models the final configuration afterwards. Furthermore, the learned effect model, denoted by $\Gamma_{1T,a}$, contains TP-GMMs for the predicted final system state, i.e., $\Gamma_{1T,a} = \{\{(\hat{\mu}_{1,o}^{(p)}, \hat{\Sigma}_{1,o}^{(p)}), \forall p \in P_{1,a}\}, \forall o \in O_a \cup e\}$, where $P_{1,a}$ is defined in $\Gamma_{1,a}$. It is worth noting the differences among these three models: the task parameters for $\Gamma_{T,a}$ are computed from the final system state (after performing a), while those for $\Gamma_{1,a}$ and $\Gamma_{1T,a}$ are extracted from the initial system state (before performing a). For the sake of notation $\Gamma_a \triangleq \{\Gamma_{1,a}, \Gamma_{T,a}, \Gamma_{1T,a}\}$.

Then, the transition probability from one final component $k_f$ of $\Theta_{a_1}$ to one initial component $k_i$ of $\Theta_{a_2}$ is:

$$\alpha_{k_fk_i} \propto \exp(-\Sigma_{p \in P_c} KL(\Gamma_{T,a_1}^{(p)}(k_f) \| \Gamma_{1,a_2}^{(p)}(k_i))), \quad (4)$$

where $KL(\cdot\|\cdot)$ is the KL(Kullback-Leibler)-divergence, $\Gamma_{T,a_1}^{(p)}(k_f)$ is the GMM associated with component $k_f$ for frame p, $\Gamma_{1,a_2}^{(p)}(k_i)$ is the GMM associated with component $k_i$ for frame p; $P_c = P_{T,a_1} \cap P_{1,a_2}$ is the set of common frames shared by these two models, which can be forced to be nonempty by always adding the global frame. This process is repeated for all pairs of final components in $\Theta_{a_1}$ and initial components in $\Theta_{a_2}$. It should be noted that the out-going probability of any final component in $\Theta_{a_1}$ should be normalized.

Secondly, given one final component $k_f$ of $\Theta_{a_1}$, each component k of $\Theta_{a_2}$ should be affine-transformed as follows:

$$(\hat{\mu}_k^{(\hat{p})}, \hat{\Sigma}_k^{(\hat{p})}) \triangleq (\mu_k^{(p)}, \Sigma_k^{(p)}) \otimes (b_{k_f}^{(p)}, A_{k_f}^{(p)}), \quad (5)$$

where the operation $\otimes$ is defined as the same operation of (1); $(b_{k_f}^{(p)}, A_{k_f}^{(p)})$ is the task parameter computed from the mean of $\Gamma_{1T,a_1}^{(\hat{p}),o}(k_f)$, where o is the object associated with the old frame p in $\Theta_{a_1}$ and $\hat{p}$ is the new frame in $\Gamma_{1T,a_1}^{o}(k_f)$. It should be noted that the change of frames is important to compute directly all components of $\Theta_{a_2}$ given an initial system state of $\Theta_{a_1}$. The same process is also applied to each component of r by changing its frames based on $\Gamma_{1T,a_1}^{o}(k_f)$.

Lastly, as stated in Algorithm 1, other model parameters of $\hat{\Theta}$ such as duration probabilities, initial and final distributions are set trivially with minor changes from $\Theta_{a_1}$ and $\Theta_{a_2}$. For instance, the duration probability of $\Theta_{a_2}$ is duplicated to $k_f$ multiple copies; the initial distributions $\Theta_{a_2}$ are set to zero as the initial states of $\hat{\Theta}$ correspond to those of the first model $\Theta_{a_1}$; the final components of $\Theta_{a_1}$ are removed since the final states of $\hat{\Theta}$ are now the final components of $\Theta_{a_2}$ updated to its multiple instances.

For the combination of two skills which are to be executed in parallel, the trajectory models of the two skills are combined into one composed trajectory model as follows.

Consider two TP-HSMMs $\Theta_{a_1}$ and $\Theta_{a_2}$ of two skills in parallel, the operation for combining them into $\hat{\Theta}$ is summarized in Algorithm 2.

---

Algorithm 2: Composing a pair of TP-HSMMs in parallel

Input: $(\Theta_{a_1}, \Gamma_{a_1})$ and $(\Theta_{a_2}, \Gamma_{a_2})$.
Output: $(\hat{\Theta}, \hat{\Gamma})$
1  Re-index the components of $\Theta_2$ by incrementing $K_1$.
   /* Compute TPHSMM $\hat{\Theta}$ */
2  Copy the all components of $\Theta_2$ and their duration distributions into $\hat{\Theta}$.
3  Append $\{a_{kh}\}_1$ of $\Theta_1$ and $\{a_{kh}\}_2$ of $\Theta_2$ diagonally into $\{a_{kh}\}$ of $\hat{\Theta}$.
4  Fill other entries in $\{a_{kh}\}$ of $\hat{\Theta}$ by 0.
   /* Compute precondition and effects TPGMM $\hat{\Gamma}$ */

---

Algorithm 2: Composing a pair of TP-HSMMs in parallel

5  Copy $\Gamma_1$ into $\hat{\Gamma}$.
6  Copy $\Gamma_2$ (with the updated components name) into $\hat{\Gamma}$.

---

Algorithm 2 consists of two parts: one part to compute the composed TP-HSMM model $\hat{\Theta}$ and another part to compute the composed TPGMM model $\hat{\Gamma}$. The first and most important step is to update component indices of $\Theta_2$ by the total number of components in $\Theta_1$. This is to avoid multiple components form different skills with the same index. After this, all associated TPGMM model, duration model, precondition and effect model have be updated accordingly. Last but not least, when computing the composed transition matrix $\{a_{kh}\}$, we need to append $\{a_{kh}\}_1$ of $\Theta_1$ and $\{a_{kh}\}_2$ of $\Theta_2$ diagonally into $\{a_{kh}\}$ while filling the remaining entries by zero. This means that no additional transitions are added from $\Theta_1$ to $\Theta_2$, as they are composed in parallel (i.e., not in sequence).

In summary, generating the composed model in 304 includes repeated application of the following operations of two skills:
1) Operation 1 (cascading skills in sequence): if "skill#1" and "skill#2" are connected in sequence (as illustrated in FIG. 4), calculate composed skill model according to algorithm 1
2) Operation 2 (combining skills in branches): if "skiing" and "skill#2" are connected in parallel (as illustrated in FIG. 5), calculate composed skill model according to algorithm 2

Specifically, these two operations are repeatedly performed as follows:
A) For each branch or sub-branch within the task diagram 303, apply operation 1 recursively to derive the composed skill for each branch.
B) For all parallel branches, apply operation 2 recursively to) derive the composed skill for all branches. Note that after A, each branch should only have one composed skill.
C) Recursively, apply A to all sequences of skills, and B to all parallels of skills.

For example, for the task illustrated in FIG. 4, the process for generation of the composed model includes an application of A, then B, then again A and then again B as illustrated in FIGS. 6 to 9.

Figure 6:
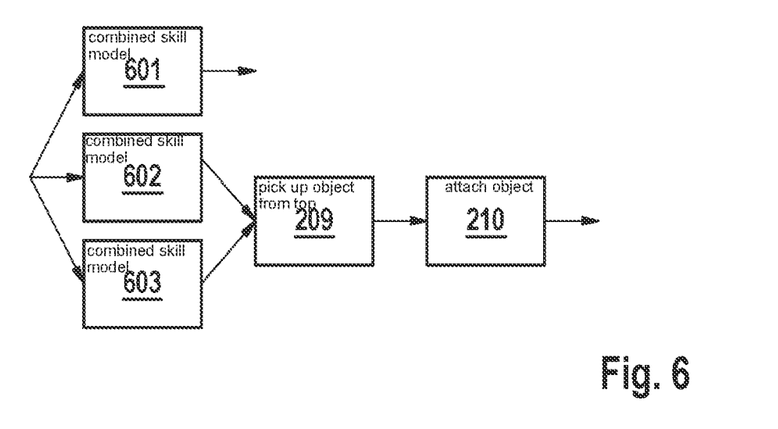
FIG. 6 shows the resulting task diagram after an application of a cascading operation to the task diagram of FIG. 2.

FIG. 6 shows the result after a first application of A to the task as given by the task diagram of FIG. 2.

The skill models 201 and 205 have been combined to 601, the skill models 203, 207 have been combined to 602 and the skill models 204, 208 have been combined to skill model 603.

Figure 7:
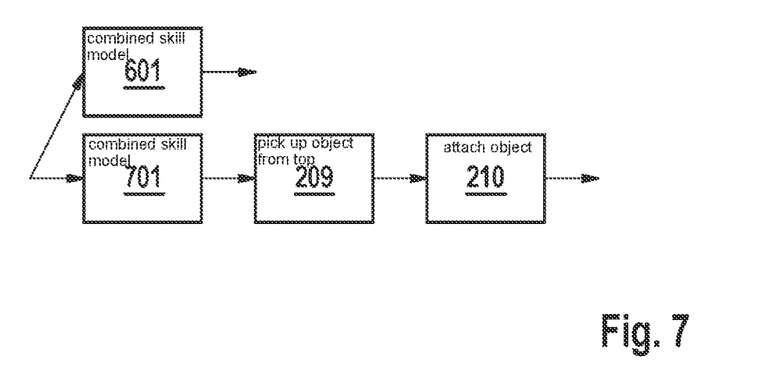
FIG. 7 shows the resulting task diagram after an application of a combining operation to the task diagram of FIG. 6.

FIG. 7 shows the result after a first application of B. The skill models 602 and 603 have been combined to skill model 701.

Figure 8:
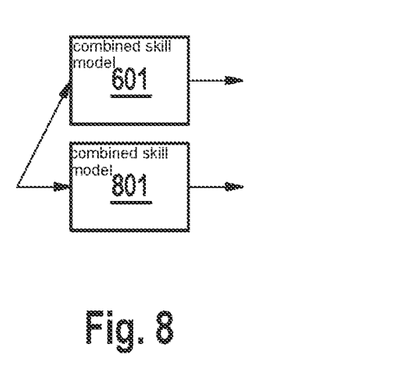
FIG. 8 shows the resulting task diagram after an application of a cascading operation to the task diagram of FIG. 7.

FIG. 8 shows the result after a second application of A. The skill models 701, 209 and 210 have been combined to skill model 801.

Figure 9:
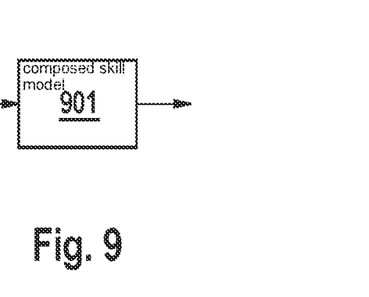
FIG. 9 shows the resulting task diagram after an application of a combining operation to the task diagram of FIG. 8.

FIG. 9 shows the result after a second application of B. The skill models 601 and 801 have been combined to skill model 901.

As can be seen, in FIG. 9, the whole task is represented by a single composed skill model 901. No "if" conditions are needed.

When the composed robot trajectory model has been generated in 304, a task may be executed in a given situation.

For this, the initial system state (configuration) in the given situation is observed in 305 and, e.g. by applying equation (3) to the composed robot trajectory model, the most-likely sequence of components within the composed robot trajectory model is determined, which drives the system (including the robot and objects) to the goal state with the highest probability.

The determination of the sequence of components also outputs the actual sequence of skills that need to be executed under the given situation. This is of importance because the sequence of skills is different when different branches are chosen by the algorithm.

In 306, during execution, the optimal sequence of skills contained in this output is executed by following the optimal sequence of components. Given the state sequence linear quadratic tracking (LQT) may for example be used to retrieve the optimal trajectory.

Figure 10:
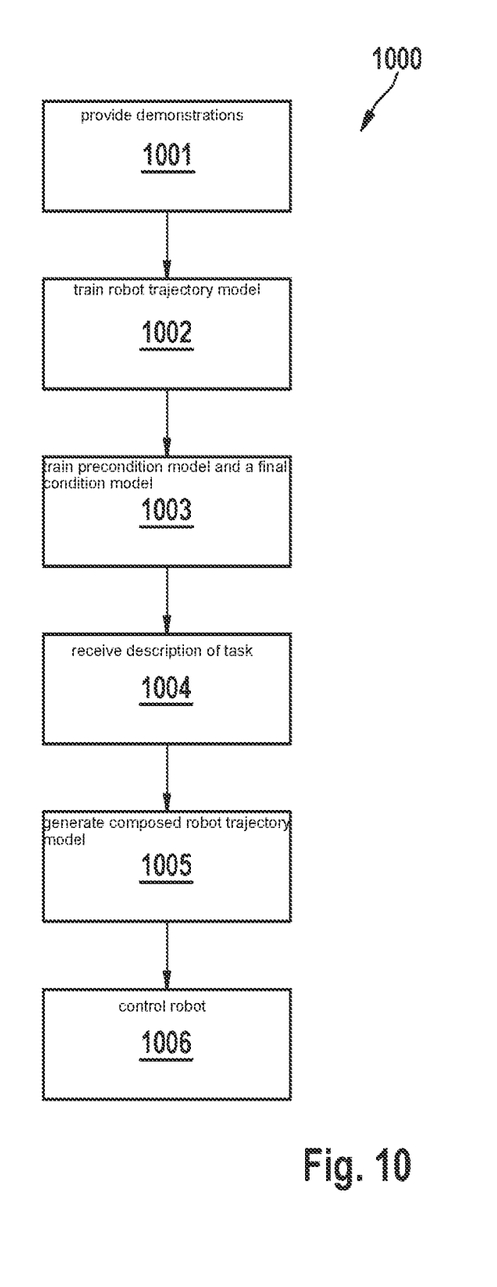
FIG. 10 shows a flow diagram illustrating a method for controlling a robot according to an example embodiment of the present invention.

In summary, according to various embodiments, a method is provided as illustrated in FIG. 10.

FIG. 10 shows a flow diagram 1000 illustrating a method for controlling a robot according to an embodiment.

In 1001, demonstrations are provided for performing each of a plurality of skills.

In 1002, a robot trajectory model is trained for each skill from the demonstrations, wherein each trajectory model is a hidden semi-Markov model having one or more initial states and one or more final states.

In 1003, a precondition model including, for each initial state of the robot trajectory model of the skill, a probability distribution of robot configurations before executing the skill, and a final condition model including, for each final state of the robot trajectory model of the skill, a probability distribution of robot configurations after executing the skill, are trained from the demonstrations for each skill.

In 1004, a description of a task is received, wherein the task includes performing the skills of the plurality of skills in sequence and/or branches.

In 1005, a composed robot trajectory model is generated by
  When two skills are to be performed in sequence in the task, cascading the robot trajectory models of the skills by
    Including the states of the trajectory models of the two skills in the composed robot trajectory model and
    Calculating a transition probability between each final state of the trajectory model of the first skill of the two skills and each initial state of the trajectory model of the second skill of the two skills as a function of the similarity between the probability distribution of the final condition model of the first skill for the final state of the first skill and the probability distribution of the initial model of the second skill for the initial state for the second skill
  When two skills are performed in branches in the task, combining the robot trajectory models of the skills by
    Including the states of the trajectory models of the two skills in the composed robot trajectory model and
    Setting the transition probability between states of the first skill and states of the second skill to zero.

In 1006, the robot is controlled in accordance with the composed robot trajectory model to execute the task.

According to various embodiments, in other words, models for a robot are trained for a plurality of skills and when a task is to be carried out which involves multiple of executions of those skills in branches or in sequence, the models are cascaded and/or combined to a composed model. The composed model may then be used for controlling the robot as if it was a model for a single skill, i.e. for example by determining an optimal state sequence for the task (and the initial configuration of robot and objects where the task is to be executed) and controlling the robot accordingly.

The method of FIG. 10 may be performed by one or more computers including one or more data processing units. The term "data processing unit" can be understood as any type of entity that allows the processing of data or signals. For example, the data or signals may be treated according to at least one (i.e., one or more than one) specific function performed by the data processing unit. A data processing unit may include an analogue circuit, a digital circuit, a composite signal circuit, a logic circuit, a microprocessor, a micro controller, a central processing unit (CPU), a graphics processing unit (GPU), a digital signal processor (DSP), a programmable gate array (FPGA) integrated circuit or any combination thereof or be formed from it. Any other way of implementing the respective functions, which will be described in more detail below, may also be understood as data processing unit or logic circuitry. It will be understood that one or more of the method steps described in detail herein may be executed (e.g., implemented) by a data processing unit through one or more specific functions performed by the data processing unit.

The term "robot" can be understood to refer to any physical system (with a mechanical part whose movement is controlled), such as a computer-controlled machine, a vehicle, a household appliance, a power tool, a manufacturing machine, a personal assistant or an access control system.

Various embodiments may receive and use sensor signals from various sensors such as video, radar, LiDAR, ultrasonic, motion, thermal imaging etc., for example to obtain sensor data regarding demonstrations or system (robot and object) states and configurations and scenarios. The sensor data may be processed. This may include classification of the sensor data or performing a semantic segmentation on the sensor data, for example to detect the presence of objects (in the environment in which the sensor data was obtained). Embodiments may be used for training a machine learning system and controlling a robot, e.g. a robotic manipulators autonomously to achieve various manipulation tasks under different scenarios. In particular, embodiments are applicable to the control and monitoring of execution of manipulation tasks, e.g., in assembly lines. They can for example be seamlessly integrated with a traditional GUI for a controlling process.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

The invention claimed is:

1. A method for controlling a robot, comprising:
providing demonstrations for performing each of a plurality of skills;
training, from the demonstrations, a robot trajectory model for each skill of the skills, wherein each trajectory model is a hidden semi-Markov model having one or more initial states and one or more final states;

training, from the demonstrations, (i) a precondition model for each skill including, for each initial state of the robot trajectory model of the skill, a probability distribution of robot configurations before executing the skill, and (ii) a final condition model for each skill including, for each final state of the robot trajectory model of the skill, a probability distribution of robot configurations after executing the skill;

receiving a description of a task, wherein the task includes performing skills of the plurality of skills in sequence and/or branches;

generating a composed robot trajectory model by:
when two skills are to be performed in sequence in the task, cascading the robot trajectory models of the skills by:
including the states of the trajectory models of the two skills in the composed robot trajectory model, and
calculating a transition probability between each final state of the trajectory model of a first skill of the two skills and each initial state of the trajectory model of a second skill of the two skills as a function of a similarity between the probability distribution of the final condition model of the first skill for the final state of the first skill and the probability distribution of the initial model of the second skill for the initial state for the second skill,
when two skills are performed in branches in the task, combining the robot trajectory models of the skills by:
including the states of the trajectory models of the two skills in the composed robot trajectory model, and
setting a transition probability between states of a first skill of the two skills and states of a second skill of the two skills to zero; and controlling the robot in accordance with the composed robot trajectory model to execute the task.

2. The method of claim 1, wherein each skill of the skills includes a manipulation of one or more objects by the robot and the hidden semi-Markov model of each skill is a task-parameterized hidden semi-Markov models including task parameters corresponding to a robot and object configuration in which the skill is applied.

3. The method of claim 2, further comprising:
training, for each skill of the skills, an effect model including, for each final state of the robot trajectory model of the skill, a probability distribution of how the robot and/or object configuration is changed after executing the skill relative to an initial robot and/or object configuration to which the skill is applied, wherein, when two skills are to be performed in sequence in the task, cascading the robot trajectory models of the two skills including transforming the task-parameterized hidden semi-Markov model of a second skill of the two skills such that its task parameters are task parameters corresponding to the robot and/or object configuration given by the effect model of a first skill of the two skills.

4. The method of claim 3, further comprising:
affine-transforming the effect model of the second skill such that its task parameters are the task parameters corresponding to the robot and/or object configuration given by the effect model of the first skill.

5. The method of claim 1, further comprising, when two skills of the skills are to be performed in sequence in the task, using the precondition model of a first skill of the two skills as precondition model for the cascaded robot trajectory models of the skills of the two skills and using the final condition model of a second skill of the two skills as final condition model for the cascaded robot trajectory models of the skills.

6. The method of claim 1, further comprising:
when two skills of the skills are to be performed in branch in the task, including both the precondition model for a first skill of the two skills and the precondition model for the second skill of the two skills in the precondition model of the combined robot trajectory models of the skills and including both the final condition model for the first skill and the final condition model for the second skill in the precondition model of the combined robot trajectory models of the skills.

7. The method of claim 1, wherein the similarity between the probability distribution of the final condition model of the first skill for the final state of the first skill and the probability distribution of the initial model of the second skill for the initial state for the second skill is a KL-divergence of the probability distribution of the final condition model of the first skill for the final state of the first skill and the probability distribution of the initial model of the second skill for the initial state for the second skill.

8. The method of claim 1, wherein the precondition model and the final condition model are task-parameterized Gaussian mixture models.

9. The method of claim 1, wherein generating the composed robot trajectory model includes repeatedly cascading robot trajectory models, cascaded robot trajectory models, and combined robot trajectory models, and combining robot trajectory models, cascaded robot trajectory models, and combined robot trajectory in accordance with the task such that the robot trajectory model is a trajectory model for a whole task.

10. A robot controller configured to control a robot, the robot controller configured to:
provide demonstrations for performing each of a plurality of skills;
train, from the demonstrations, a robot trajectory model for each skill of the skills, wherein each trajectory model is a hidden semi-Markov model having one or more initial states and one or more final states;
train, from the demonstrations, (i) a precondition model for each skill including, for each initial state of the robot trajectory model of the skill, a probability distribution of robot configurations before executing the skill, and (ii) a final condition model for each skill including, for each final state of the robot trajectory model of the skill, a probability distribution of robot configurations after executing the skill;
receive a description of a task, wherein the task includes performing skills of the plurality of skills in sequence and/or branches;
generate a composed robot trajectory model by:
when two skills are to be performed in sequence in the task, cascading the robot trajectory models of the skills by:
including the states of the trajectory models of the two skills in the composed robot trajectory model, and
calculating a transition probability between each final state of the trajectory model of a first skill of the two skills and each initial state of the trajectory model of a second skill of the two skills as a function of a similarity between the probability distribution of the final condition model of the first skill for the final state of the first skill and the probability distribution of the initial model of the second skill for the initial state for the second skill, when two skills are performed in branches in the task, combining the robot trajectory models of the skills by:
including the states of the trajectory models of the two skills in the composed robot trajectory model, and
setting a transition probability between states of a first skill of the two skills and states of a second skill of the two skills to zero; and control the robot in accordance with the composed robot trajectory model to execute the task.

11. A non-transitory computer readable medium on which are stored instructions for controlling a robot, the instructions, when executed by a processor, causing the processor to perform the following:

providing demonstrations for performing each of a plurality of skills;

training, from the demonstrations, a robot trajectory model for each skill of the skills, wherein each trajectory model is a hidden semi-Markov model having one or more initial states and one or more final states;

training, from the demonstrations, (i) a precondition model for each skill including, for each initial state of the robot trajectory model of the skill, a probability distribution of robot configurations before executing the skill, and (ii) a final condition model for each skill including, for each final state of the robot trajectory model of the skill, a probability distribution of robot configurations after executing the skill;

receiving a description of a task, wherein the task includes performing skills of the plurality of skills in sequence and/or branches;

generating a composed robot trajectory model by:
when two skills are to be performed in sequence in the task, cascading the robot trajectory models of the skills by:
including the states of the trajectory models of the two skills in the composed robot trajectory model, and
calculating a transition probability between each final state of the trajectory model of a first skill of the two skills and each initial state of the trajectory model of a second skill of the two skills as a function of a similarity between the probability distribution of the final condition model of the first skill for the final state of the first skill and the probability distribution of the initial model of the second skill for the initial state for the second skill, when two skills are performed in branches in the task, combining the robot trajectory models of the skills by:
including the states of the trajectory models of the two skills in the composed robot trajectory model, and
setting a transition probability between states of a first skill of the two skills and states of a second skill of the two skills to zero; and controlling the robot in accordance with the composed robot trajectory model to execute the task.

* * * * *